(12) United States Patent
Chiba

(10) Patent No.: US 8,090,528 B2
(45) Date of Patent: Jan. 3, 2012

(54) NAVIGATION APPARATUS AND COMPUTER PROGRAM

(75) Inventor: Wataru Chiba, Okazaki (JP)

(73) Assignee: Aisin AW Co., Ltd., Anjo-Shi, Aichi (JP)

( * ) Notice: Subject to any disclaimer, the term of this patent is extended or adjusted under 35 U.S.C. 154(b) by 548 days.

(21) Appl. No.: 12/292,305

(22) Filed: Nov. 17, 2008

(65) Prior Publication Data

US 2009/0171570 A1    Jul. 2, 2009

(30) Foreign Application Priority Data

Dec. 27, 2007   (JP) ................................. 2007-336556

(51) Int. Cl.
*G01C 21/00*    (2006.01)
(52) U.S. Cl. ......................................... 701/201; 701/209
(58) Field of Classification Search .................. 701/201, 701/209
See application file for complete search history.

(56) References Cited

U.S. PATENT DOCUMENTS

| | | | |
|---|---|---|---|
| 6,401,034 B1 | 6/2002 | Kaplan et al. | 701/209 |
| 2003/0225510 A1 | 12/2003 | Ono et al. | 701/207 |
| 2005/0251334 A1* | 11/2005 | Mizuno | 701/209 |
| 2006/0265422 A1* | 11/2006 | Ando et al. | 707/104.1 |
| 2007/0225904 A1 | 9/2007 | Pantalone et al. | |

FOREIGN PATENT DOCUMENTS

| | | |
|---|---|---|
| JP | 2001-027536 | 1/2001 |
| JP | 2004-093154 | 3/2004 |
| JP | 2005-010091 | 1/2005 |
| JP | 2007-139931 | 6/2007 |

* cited by examiner

*Primary Examiner* — James Trammell
*Assistant Examiner* — Michael D Lang
(74) *Attorney, Agent, or Firm* — Bacon & Thomas, PLLC

(57) ABSTRACT

When a map image in the periphery of a vehicle position is displayed on a liquid crystal display in 3D, POIs existing in a first searching region within a first searching distance from a current position of the vehicle are searched in an area in the vicinity of the vehicle position by setting all types of points as search targets, POIs existing in a second searching region within a second searching distance from a second searching point are searched in an area distant from the vehicle position by setting only specific types of points as search targets, and icon symbols indicating types and positions of the points are displayed on the map image while being overlapped therewith based on the searched POIs.

8 Claims, 8 Drawing Sheets

FIG. 2

POI (POINT OF INTEREST)

| POI NUMBER | 10001 | 10002 | 10003 | 10004 | ... |
|---|---|---|---|---|---|
| POI NAME | WW STATION | XX PARKING LOT | YY GAS STATION | ZZ HOSPITAL | ... |
| POI TYPE | STATION | PARKING LOT | GAS STATION | HOSPITAL | ... |
| POI COORDINATES | (x1, y1) | (x2, y2) | (x3, y3) | (x4, y4) | ... |
| ... | ... | ... | ... | ... | ... |

| | POI TYPE | ICON SYMBOL | VICINITY-AREA SEARCHING CONDITION (DISPLAY SCALE) | DISTANT-AREA SEARCHING CONDITION (DISPLAY SCALE) |
|---|---|---|---|---|
| 1 | AIRPORT |  | 10m–10km | 10m–6km |
| 2 | STATION |  | 10m–5km | 10m–3km |
| 3 | SHOPPING CENTER |  | 10m–2km | — |
| 4 | HOSPITAL |  | | — |
| 5 | GAS STATION |  | | — |
| 6 | CONVENIENCE STORE |  | 10m–400m | — |
| ... | ... | ... | ... | ... |

(1)-(5): SEARCHING ORDER

SEARCHING REGION REQUIRED
FOR CONDUCTING 2D DISPLAY

SEARCHING REGION REQUIRED
FOR CONDUCTING 3D DISPLAY

NAVIGATION APPARATUS AND COMPUTER PROGRAM

INCORPORATION BY REFERENCE

The disclosure of Japanese Patent Application No. 2007-336556 filed on Dec. 27, 2007 including the specification, drawings and abstract is incorporated herein by reference in its entirety.

BACKGROUND

1. Field of the Invention

The present invention relates to a navigation apparatus and a computer program for searching and providing guidance regarding information related to points in the periphery of a reference position.

2. Description of the Related Art

In recent years, vehicles often have a navigation apparatus mounted thereon, which performs vehicle travel guidance so as to enable a driver to easily reach a desired destination. Here, the navigation apparatus is an apparatus capable of detecting a current position of a vehicle using a GPS receiver or the like, obtaining map data corresponding to the current position through a recording medium such as a DVD-ROM and an HDD or a network, and displaying the map data on a liquid crystal monitor. Further, in such a navigation apparatus, in order to perform guidance regarding a point of interest (POI) such as a type, a position and the like of a point (a facility or the like) which exists in the periphery of the current position of the vehicle, icons indicating the points are also drawn on a map image.

For instance, Japanese Patent Application Publication No. JP-A2005-10091 (pages 6 to 8, FIG. 4) and Japanese Patent Application Publication No. JP-A2007-139931 (pages 9 and 10, FIG. 7) disclose a technique for displaying icons indicating positions and types of points (facilities) on a map image displayed on a display in 2D or 3D in which the icons correspond to a positional relationship on the map.

SUMMARY

Here, in order to perform guidance regarding the POIs as performed in the techniques disclosed in the aforementioned Japanese Patent Application Publication No. JP-A2005-10091 and Japanese Patent Application Publication No. JP-A2007-139931, there is a need to search a database (DB) or the like storing the POIs and to select and obtain only the POIs regarding points located in the periphery of the vehicle. Here, conventionally, in order to search POIs, a region within a predetermined distance in which a vehicle position is set as a center (specifically, inside a circle in which the vehicle position is set as a center and a radius thereof is set to the predetermined distance (500 m, for example) is set as a searching region). In addition, this searching region must be a region including at least an area of a map to be a target displayed on a display (hereinafter, refer to as display target area). Further, the display target area is determined based on a current position of the vehicle and a scale of a map image displayed on the display. For example, if an area in the periphery of a vehicle position 101 framed by a substantial rectangle is set as a display target area 102 as shown in FIG. 8, a searching area 103 must be a circle having the vehicle position 101 as a center and having a size which surrounds at least the display target area 102.

Further, a navigation apparatus in recent years displays a map image to be displayed on a display also in 3D, as disclosed in the aforementioned Japanese Patent Application Publication No. JP-A2007-139931. Further, when the map image is displayed in 3D, a display target area to be a display target on the display becomes large compared to a display target area used when displaying the map image in 2D with a scale same as that of the former map image. Here, FIG. 9 is a view showing a display target area 112 used in 3D display with the same scale and the same vehicle position 101 as those of FIG. 8. As shown in FIG. 9, the display target area 112 used in 3D display becomes significantly large compared to the display target area 102 used when performing the 2D display. Further, in the display target area 112, the width must be wider as the distance from the vehicle position 101 increases. Therefore, the display target area 112 takes a substantially trapezoid shape. Accordingly, a searching region 113 surrounding the display target area 112 must be significantly enlarged compared to the searching region 103 used in 2D display.

Further, in recent years, in order to further approximate the map image displayed in 3D to the actual view, it is proposed that an area further distant from the vehicle position is also set as the display target area. Therefore, it is necessary to further enlarge the searching region for searching the POIs. Here, in a processing for searching the POIs, a processing load on a CPU and a required amount of memory are significantly changed depending on a size of the searching region. That is, when the searching region becomes large, the processing load on the CPU is increased, resulting in an increase in the required amount of memory.

Further, Japanese Patent Application Publication No. JP-A-2005-10091 discloses a technique for reducing the number of icons of the POIs to be displayed on the display. However, since the POIs are searched in a searching region which is the same as the conventionally used one, the reduction in the processing load on the CPU was not fully realized.

The present invention has been made in order to eliminate the aforementioned conventional problems, and an object thereof is to provide a navigation apparatus and a computer program capable of minimizing a searching region and reducing a processing burden of a CPU and a required amount of memory even when POIs are searched from a large area or an area with a distorted shape.

With a navigation apparatus according to a first aspect that is structured as above, even when information regarding points is searched from a large area or an area with a distorted shape, it is possible to minimize a searching region by conducting the search using a plurality of searching regions with different shapes. Accordingly, it is possible to reduce a processing load on a CPU and a required amount of memory.

With a navigation apparatus according to a second aspect, when a searching region is set to be a circular one, it is possible to search information regarding points by using a searching region with a new shape in which a plurality of circular searching regions are combined together by specifying a plurality of center points of the former searching region. Accordingly, even when the information regarding the points is searched from an area with a distorted shape, the searching region can be minimized.

With a navigation apparatus according to a third aspect, since a circular searching region for searching an area distant from a reference position is made to be smaller than a searching region for searching an area in the vicinity of the reference position, the searching region can be minimized especially when searching an area of a substantially trapezoid shape that is to be a display target on a display at the time of performing a 3D display.

With a navigation apparatus according to a fourth aspect, since only information regarding specific types of points is set as a search target when searching an area distant from a reference position, it is possible to set, in advance, only specific points that are to be landmarks in a traveling direction of a vehicle as search targets in a distant area in which a searching region is large and there is a smaller need for guiding information regarding points than in the vicinity of the reference position.

With a navigation apparatus according to a fifth aspect, it is possible to preferentially search information regarding points from an area which is highly required to be guided in the future and to provide guidance regarding the information to a user based on a traveling direction of a vehicle to be predicted. Accordingly, even if it takes a long time for a CPU to perform a search processing, it is possible to conduct appropriate guidance regarding the points.

With a navigation apparatus according to a sixth aspect, since information regarding points is provided by displaying icons on a map image, it is possible to make a user easily understand the information regarding the points at a glance.

With the use of a computer program according to a seventh aspect, even when the program causes a computer to search information regarding points from a large area or an area with a distorted shape, it is possible to minimize a searching region by conducting the search using a plurality of searching regions with different shapes. Accordingly, it is possible to reduce a processing load on a CPU and a required amount of memory.

BRIEF DESCRIPTION OF THE DRAWINGS

FIG. 2 is a view showing one example of points to be stored as POIs;

DETAILED DESCRIPTION OF THE PREFERRED EMBODIMENTS

Figure 1:
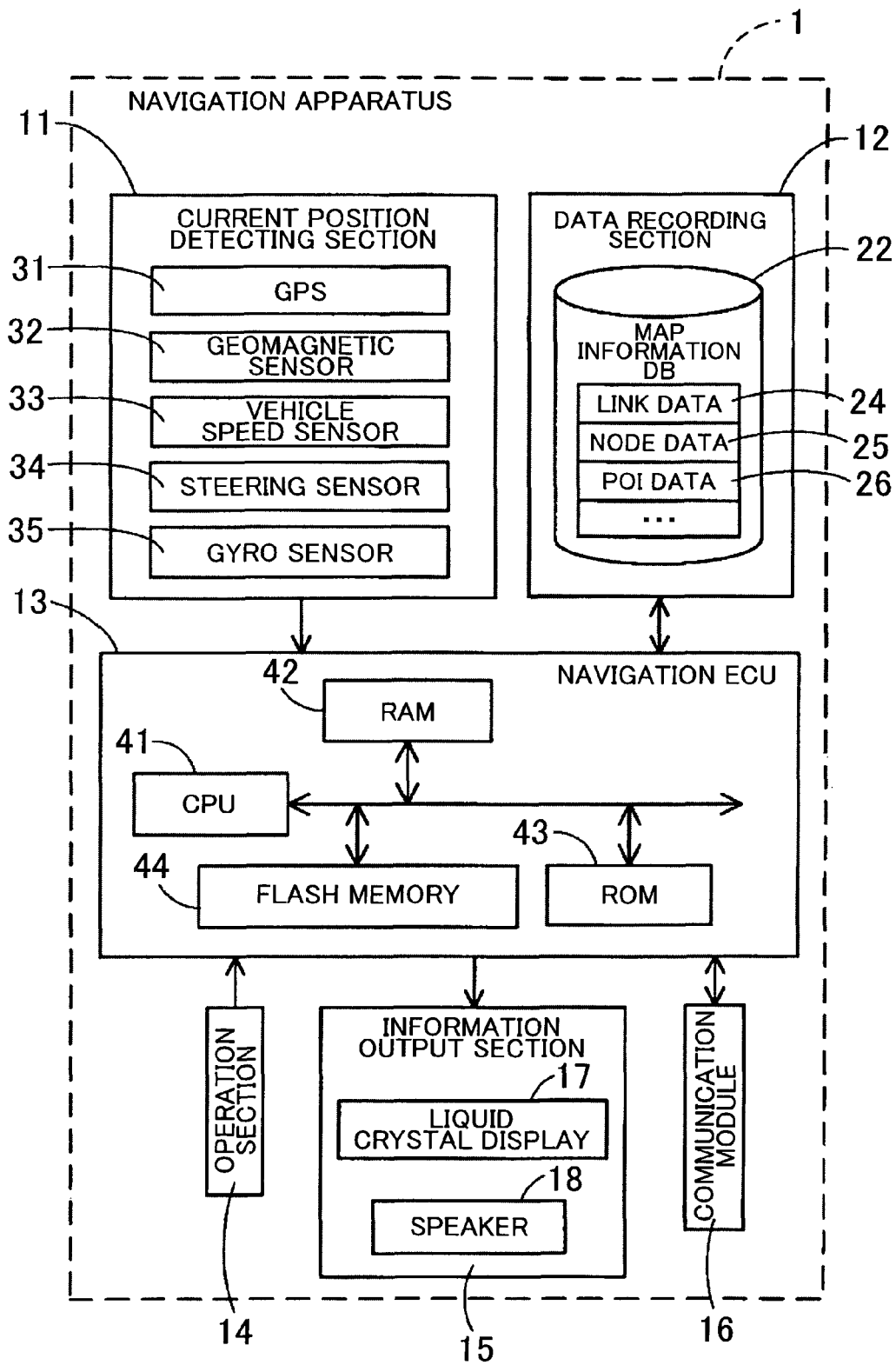
FIG. 1 is a block diagram showing a navigation apparatus according to the present embodiment.

Hereinafter, a navigation apparatus according to the present invention will be described in detail, based on an embodiment realizing the present invention with reference to the drawings. First, a schematic structure of a navigation apparatus 1 according to the present embodiment will be described using FIG. 1. FIG. 1 is a block diagram showing the navigation apparatus 1 according to the present embodiment.

As shown in FIG. 1, the navigation apparatus 1 according to the present embodiment includes: a current position detecting section 11 detecting a current position of a vehicle; a data recording section 12 having various types of data recorded therein; a navigation ECU (a reference position obtaining unit, a searching region setting unit, a point information obtaining unit, a guidance unit, a searching point specifying unit, a distance associating unit, and a traveling direction predicting unit) 13 performing various kinds of calculation processings; an operation section 14 receiving an operation from an operator; an information output section 15 outputting various pieces of information regarding map information, a guidance route, guidance for POIs and the like; and a communication module 16 communicating with an information center such as a traffic information center. Note that the POI refers to digital content data corresponding to positional information such as facility information and spot information.

Hereinafter, respective components composing the navigation apparatus 1 will be described.

The current position detecting section 11 is formed of a GPS 31, a geomagnetic sensor 32, a vehicle speed sensor 33, a steering sensor 34, a gyro sensor 35, an altimeter (not shown) and the like, and can detect a current position and direction of a vehicle, a traveling speed of the vehicle and the like. Here, in particular, the vehicle speed sensor 33 is a sensor for detecting a moving distance and a speed of the vehicle, generates pulses in accordance with a rotation of wheels of the vehicle, and outputs pulse signals to the navigation ECU 13. Subsequently, by counting the number of generated pulses, the navigation ECU 13 calculates a rotation speed of the wheels and the moving distance. Note that the navigation apparatus 1 is not required to include all the aforementioned five kinds of sensors, and it may be structured to include only one or a plurality of kinds of sensors among them.

The data recording section 12 is provided with a hard disk (not shown) serving as an external storage device and a recording medium, a map information DB 22 recorded in the hard disk, and a recording head (not shown) serving as a driver for reading a predetermined program or the like and writing predetermined data in the hard disk.

Here, in the map information DB 22, various kinds of map data required for conducting route guidance and traffic information guidance and for displaying a map are recorded. Specifically, the map information DB 22 is formed of link data 24 regarding road (link) shapes, node data 25 regarding node points, POI data 26 that is information regarding points such as facilities, search data for searching routes, intersection data regarding respective intersections, search data for searching points, image drawing data for drawing images of a map, roads, traffic information and the like on a liquid crystal display 17, and the like.

Here, as the link data 24, the following data are recorded: regarding respective links which constitute roads, data indicating a link length, a width of the road to which the link belongs, an inclination, a cant, a bank, road surface conditions, the number of lanes of the road, locations at which the number of lanes is reduced, locations at which the width of the road narrows, crossings and the like; regarding corners, data indicating a curvature radius, intersections, T-intersections, an entrance and an exit of corners; regarding a road attribute, data indicating downhill roads, uphill roads and the like; and regarding types of the roads, data indicating general roads such as national roads, prefectural roads and city streets as well as toll roads such as national expressways, urban expressways, ordinary toll roads, and toll bridges. Further, regarding the toll roads, data related to a service road (ramp way) at an entrance and an exit of toll road, toll booths (interchanges) and the like is recorded.

As the node data 25, data regarding actual branching points of the roads (including intersections, T-intersections and the like), coordinates (positions) of node points that are set in each of the roads at a predetermined distance according to the curvature radius thereof or the like, a node attribute that shows whether each node corresponds to an intersection or not, a connected link number list which is a list of link numbers of links that are connected to the nodes, an adjacent node number list which is a list of node numbers of the nodes that are positioned adjacent to the nodes via links, a height (altitude) or the like of the respective node points and the like, are recorded.

As the POI data 26, information regarding points to be a place of departure, destination, pass-through point and the like in a navigation processing of the navigation apparatus 1 is stored. For example, information regarding points such as accommodation facilities such as hotels and inns, gas filling stations such as gas stations, commercial establishments such as shopping malls, supermarkets and shopping centers, amusement facilities such as theme parks and amusement arcades, dining facilities such as restaurants, bars and pubs, parking facilities such as public parking lots, transportation facilities, religious institutions such as temples and churches, public facilities such as art museums and museums, historic spots, sightseeing spots, viewpoints (scenic spots), open spaces, intersections, public buildings, monuments and the like, corresponds to the POI data 26.

Further, as the POI data 26, information including a POI number, which is an identifier of the point, a POI name showing a name of the point, a POI type showing a type such as a type of the point ("parking lot", "post office", "restaurant" and the like), POI coordinates indicating coordinates of the point, and the like of each point is stored. Here, FIG. 2 is a view showing one example of information regarding the points stored as the POI data 26.

For example, in an example of the POI data 26 shown in FIG. 2, it is indicated that WW Station corresponding to the POI number "10001" is located at a point having the coordinates (x1, y1). Further, it is indicated that XX Parking Lot corresponding to the POI number "10002" is located at a point having the coordinates (x2, y2). Information regarding other points is also stored in the same manner.

Figure 3:
FIG. 3 is a view showing one example of icon symbols and searching conditions to be stored as the POIs.
Figure 3:
Figure 3:
Figure 3:
Figure 3:
Figure 3:

Further, icon symbols to be displayed on the liquid crystal display 17 for specifying the types and positions of the POIs and data regarding searching conditions are also stored as the POI data 26. For instance, FIG. 3 is a view showing the icon symbols corresponding to "airport", "station", "shopping center", "hospital", "gas station", and "convenience store" as the types of points and the searching conditions corresponding to the respective types. Note that as the searching conditions for searching the POIs, there are two kinds of conditions, namely, a "vicinity-area searching condition" used when searching an area in the vicinity of the current position of the vehicle and a "distant-area searching condition" used when searching an area distant from the current position of the vehicle, in which only the types of POIs corresponding to the conditions are set as search targets, as will be described later. Respective searching conditions will be described later in detail.

The navigation apparatus 1 according to the present embodiment searches points located in the periphery of the current position of the vehicle using the aforementioned POI data 26, and obtains information regarding the corresponding points from the map information DB 22. Subsequently, the navigation apparatus 1 provides guidance regarding the types and positions of the points to a user by displaying the icon symbols on corresponding positions of a map image displayed on the liquid crystal display 17.

The navigation ECU (electronic control unit) 13 is an electronic control unit controlling an entire navigation apparatus 1 through a guidance route setting processing that sets, when a destination is selected, a guidance route from a current position to the destination, a POI guidance processing that searches points located in the periphery of the vehicle position and provides guidance regarding the points based on the search result, and the like. Further, the navigation ECU 13 includes a CPU 41 serving as a computation device and a control device, and internal storage devices such as a RAM 42 used as a working memory when the CPU 41 performs various kinds of calculation processings and in which route data or the like when the route is searched is stored, a ROM 43 which records programs for controlling the various devices provided in the navigation apparatus 1, and a flash memory 44 which records a POI guidance processing program (refer to FIG. 4) and the like in addition to the program read from the ROM 43.

The operation section 14 is operated when inputting a destination as a guidance end point, and the like, and it is formed of a plurality of operation switches (not shown) such as various kinds of keys and buttons. Based on switch signals output when the respective switches are pressed, or the like, the navigation ECU 13 performs a control so as to execute various kinds of operations corresponding to the switch signals. Note that the operation section 14 may be formed of a touch panel provided on a front face of the liquid crystal display 17. Further, the operation section 14 may also be used for inputting a place of departure as a guidance start point.

The information output section 15 is composed of the liquid crystal display 17, a speaker 18 and the like, and outputs for a user various kinds of information regarding a map of the periphery of the vehicle, a guidance route and the POIs.

Here, the liquid crystal display 17 constituting the information output section 15 is attached to a center console or a panel surface in the vehicle interior. On the liquid crystal display 17, a map image including roads, traffic information, operation guidance, operation menus, key guidance, a guidance route from a current position to a destination, guidance information along the guidance route, news, weather forecasts, time, mails, TV programs and the like are displayed. Further, when displaying the map image, the icon symbols indicating the types and positions of the POIs existing within a display target area of the map are displayed on the map image while being overlapped therewith based on the POI data 26.

The speaker 18 constituting the information output section 15 outputs voice guidance for guiding to travel along the guidance route based on an instruction from the navigation ECU 13 and guidance regarding traffic information.

The communication module 16 is a communication device for receiving traffic information including various information such as congestion information, traffic restriction information, parking lot information and traffic accident information transmitted from a traffic information center such as, for instance, a VICS (registered trademark: Vehicle Information and Communication System) center and a probe center. Examples of the communication module 16 include a cellular phone or a DCM.

Further, the navigation apparatus 1 may be provided with a DVD drive. The DVD drive is a drive capable of reading data recorded in a recording medium such as a DVD and a CD. An update of the map information DB 22 or the like is conducted based on the read data.

Figure 4:
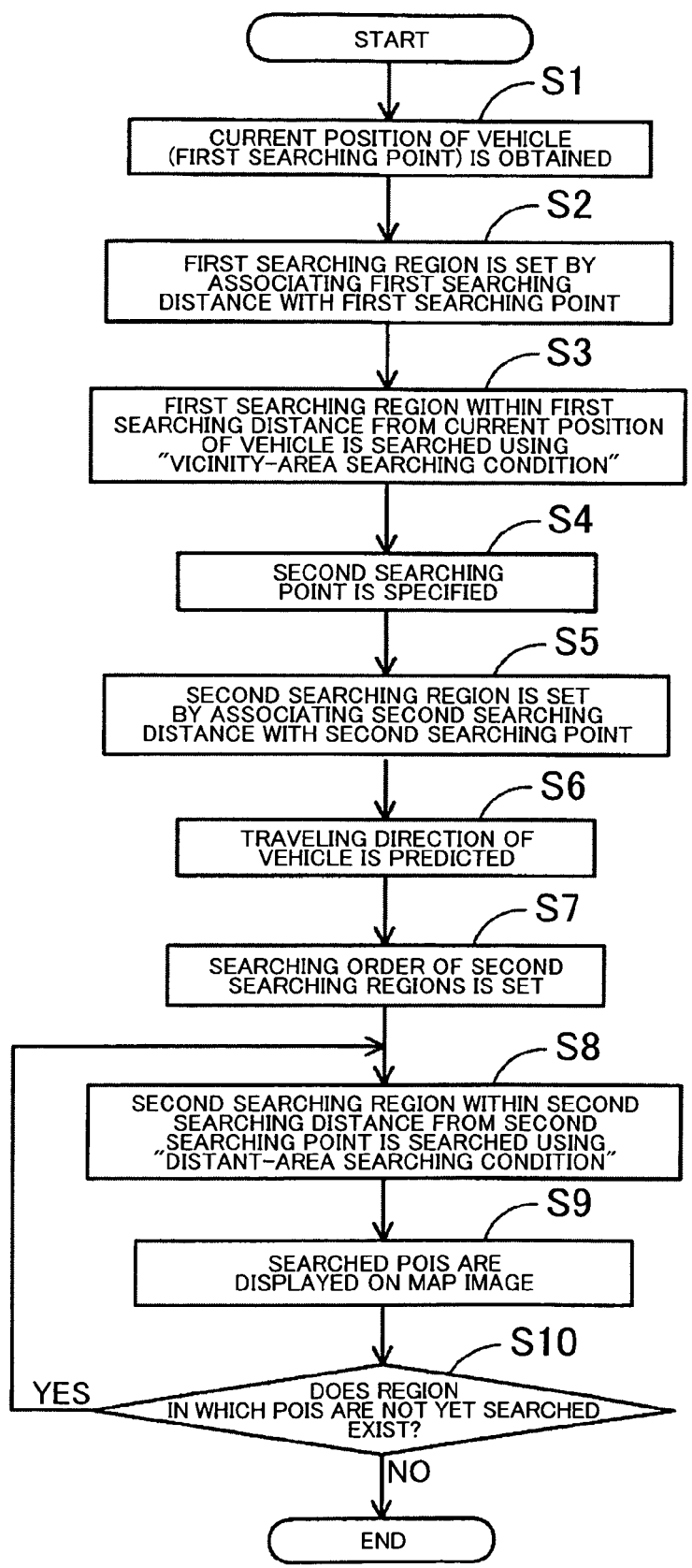
FIG. 4 is a flowchart of a point information guidance processing program according to the present embodiment.

Subsequently, the POI guidance processing program executed by the CPU 41 in the navigation apparatus 1 structured as above will be described based on FIG. 4. FIG. 4 is a flowchart of the POI guidance processing program according to the present embodiment. Here, the POI guidance processing program is executed at a predetermined interval (each 200 ms, for instance) after an ACC of a vehicle is turned on, for searching points (facilities and the like) located in the periphery of the vehicle position and providing guidance regarding information related to the points based on the search result. Note that the following program shown by the flowchart in FIG. 4 is stored in the RAM 42 or the ROM 43 provided in the navigation apparatus 1 and is executed by the CPU 41.

First, in step (hereinafter, abbreviated to S) 1 of the POI guidance processing program, the CPU 41 obtains a current position of a vehicle as a reference position for guiding map information in the periphery thereof. Specifically, the current position of the vehicle is first detected by the GPS 31, and a map matching processing in which the current position of the vehicle is specified on a map based on map information stored in the map information DB 22 is conducted. Note that the current position of the vehicle is set as a center point (first searching point) of a region (first searching region) for searching POIs especially in an area (area 54 shown in FIG. 5) in the vicinity of the current position of the vehicle in a display target area, as will be described later. Note that in the aforementioned S1, the current position of the vehicle is obtained as the reference position, but, an arbitrary point on the map other than the current position of the vehicle may also be set as the reference position. For example, when a user performs a scroll operation and the like of the map on the map screen, an arbitrary point based on the operation of the user is obtained as the reference position. Further, the aforementioned S1 corresponds to a processing of the reference position obtaining unit.

Next, in S2, the CPU 41 associates a first searching distance with the current position of the vehicle (first searching point). Here, the first searching distance is one of parameters for setting the first searching region for searching the POIs in an area in the vicinity of the vehicle position in which the current position of the vehicle is set as a center. Specifically, a region within the first searching distance from the first searching point, namely, a region inside a circle in which the first searching point is set as a center and a radius thereof is set to the first searching distance, becomes the first searching region. Note that in the present embodiment, the first searching distance is set to two-thirds of a full length L of the display target area (refer to FIG. 5) along a traveling direction of the vehicle, for instance.

Figure 5:
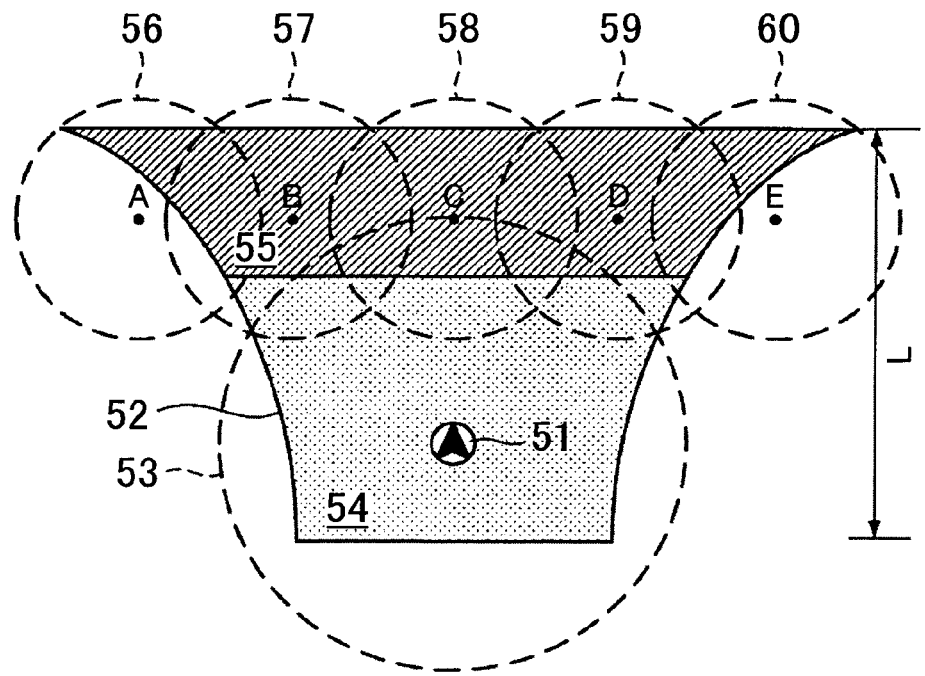
FIG. 5 is a view showing one example of a searching method of the POIs.

By performing the aforementioned processing of S2, the first searching region is set, which is a region for searching the POIs in the area (area 54 shown in FIG. 5) in the vicinity of the vehicle position. For example, if an area of a substantially trapezoid shape in the periphery of a current position of the vehicle 51 is set as a display target area 52 to be a display target on the liquid crystal display 17, as shown in FIG. 5, a first searching region 53 is a region inside a circle in which the current position of the vehicle 51 is set as a center and a radius thereof is two-thirds of L. By setting the first searching region 53, it is possible to search the POIs located especially in the area 54 in the vicinity of the vehicle position in the display target area 52.

Subsequently, in S3, the CPU 41 searches the POIs located in the first searching region set in the aforementioned S2, and obtains information regarding the points from the map information DB 22. Specifically, the CPU 41 specifies the points located in the first searching region based on the POI data 26 (refer to FIG. 2) stored in the map information DB 22 and obtains the information regarding the specified points from the map information DB 22.

Further, the POIs that are set as search targets at that time differ depending on a "type of point" and a "scale of map displayed on the liquid crystal display 17". For instance, a POI corresponding to "airport" is included in the search target only when the scale is from 10 m to 10 km, as shown in FIG. 3. Further, a POI corresponding to "station" is included in the search target only when the scale is from 10 m to 5 km. Further, POIs corresponding to "shopping center" and "hospital" are included in the search targets only when the scale is from 10 m to 2 km. Further, POIs corresponding to "gas station" and "convenience store" are included in the search targets only when the scale is from 10 m to 400 m. Accordingly, it becomes possible to previously exclude the types of POIs in which the number of location thereof is large and the number of points corresponding thereto is too large in the map with a large scale.

Thereafter, in S4, the CPU 41 specifies a second searching point. Note that the second searching point becomes a center point of a region (second searching region) for searching POIs especially in an area (area 55 shown in FIG. 5) distant from the vehicle position in the display target area, as will be described later. Note that a position of the second searching point to be specified differs depending on a shape of the display target area, and one or a plurality of second searching point(s) is (are) specified at (a) position(s) capable of including the area (area 55 shown in FIG. 5) distant from the vehicle position by (a) second searching region(s) to be set in later-described S5. In an example shown in FIG. 5, five points of A to E are specified as the second searching points.

Next, in S5, the CPU 41 associates a second searching distance with the second searching points specified in the aforementioned S4. Here, the second searching distance is a parameter for setting the second searching region for searching the POIs in the area distant from the vehicle position in which the second searching point is set as a center. Specifically, a region within the second searching distance from the second searching point, namely, a region inside a circle in which the second searching point is set as a center and a radius thereof is set to the second searching distance, is the second searching region. Note that in the present embodiment, the second searching distance is set to one-fourth of the full length L of the display target area (refer to FIG. 5) along the traveling direction of the vehicle, for instance.

By performing the aforementioned processing of S5, the second searching region is set, which is a region for searching the POIs in the area (area 55 shown in FIG. 5) distant from the vehicle position. For example, if an area of a substantially trapezoid shape in the periphery of the current position of the vehicle 51 is set as the display target area 52 that is to be a display target on the liquid crystal display 17, as shown in FIG. 5, second searching regions 56 through 60 are regions inside respective circles in which the respective second searching points A to E are set as centers and each radius thereof is one-fourth of L. By setting the second searching regions 56 through 60, it is possible to search the POIs located especially in the area 55 distant from the vehicle position in the display target area 52. Note that the aforementioned S1, S2, S4 and S5 correspond to processings of the searching region setting unit, S1 and S4 correspond to processings of the searching point specifying unit, and S2 and S5 correspond to processings of the distance associating unit.

Thereafter, in S6, the CPU 41 predicts a future traveling direction of the vehicle. Note that when a guidance route is set in the navigation apparatus 1, the traveling direction of the vehicle is predicted in accordance with the guidance route. Further, when the guidance route is not set, the traveling direction is predicted by assuming that the vehicle travels along the road on which the vehicle is currently traveling.

Note that the aforementioned S6 corresponds to a processing of the traveling direction predicting unit.

Next, in S7, the CPU 41 sets a searching order for the second searching regions set in the aforementioned S5 based on the predicted result of the traveling direction of the vehicle in the aforementioned S6. Specifically, the searching order is set such that a search for the POIs in the second searching region located in the predicted traveling direction of the vehicle is preferentially conducted.

Hereinafter, a specific example of the setting of the searching order in the aforementioned S7 will be explained using FIG. 6. Note that FIG. 6 shows an example where the vehicle is predicted to travel along a route 61 in the future.

Figure 6:
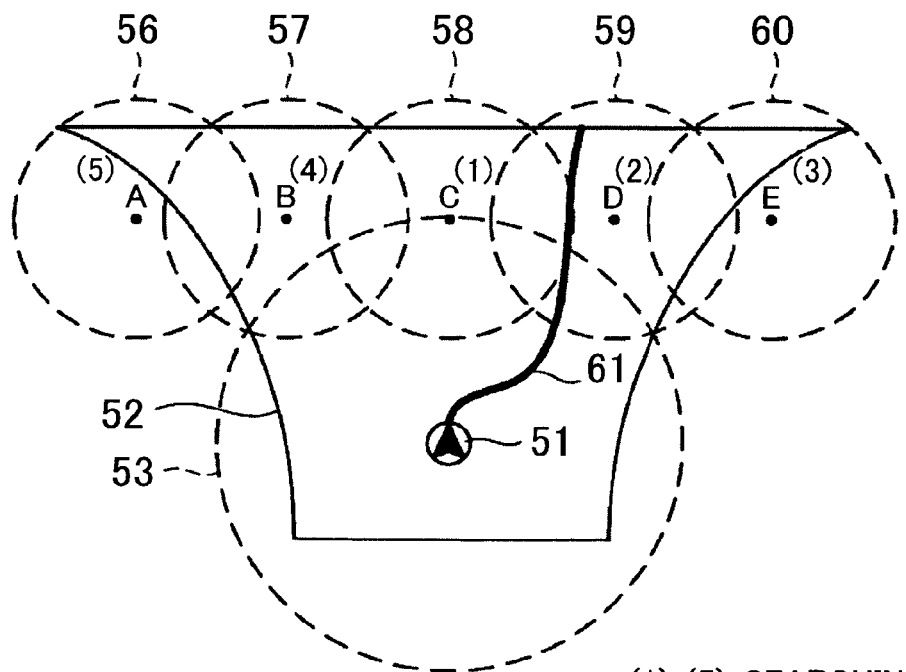
FIG. 6 is a view showing one example of a setting method for setting a searching order of second searching regions.

In an example shown in FIG. 6, the vehicle is predicted to travel along the route 61, and to direct its traveling direction toward a right direction in the future. Accordingly, the searching order is set such that, among the second searching regions 56 through 60, the second searching regions 59 and 60 located in the right direction with respect to the current traveling direction of the vehicle are searched with priority over the second searching regions 56 and 57 located in the left direction. Specifically, the searching order is set such that the second searching region 58 located in the current traveling direction of the vehicle is firstly searched, the second searching region 59 located in the right direction is secondly searched, the second searching region 60 similarly located in the right direction is thirdly searched, and thereafter, the second searching region 57 located in the left direction is fourthly searched, and the second searching region 56 similarly located in the left direction is fifthly searched. Accordingly, it is possible to sequentially search the POIs from the areas with higher possibility of being displayed on the liquid crystal display 17 in the future.

Subsequently, in S8, the CPU 41 searches the POIs located in the second searching regions set in the aforementioned S5 in accordance with the searching order set in the aforementioned S7, and obtains information regarding the corresponding POIs from the map information DB 22. Specifically, the CPU 41 specifies points located in the second searching regions based on the POI data 26 (refer to FIG. 2) stored in the map information DB 22, and obtains the information regarding the specified points (types, position coordinates and the like of the points) from the map information DB 22.

Further, the POIs that are set as search targets at that time differ depending on the "type of point" and the "scale of map displayed on the liquid crystal display 17". Further, the search for the POIs in the second searching regions is conducted by setting only specific types of POIs ("airport" and "station" in the present embodiment) as targets.

For instance, the POI corresponding to "airport" is included in the search target only when the scale is from 10 m to 6 km, as shown in FIG. 3. Further, the POI corresponding to "station" is included in the search target only when the scale is from 10 m to 3 km. Further, the POIs corresponding to other types are excluded from the search targets. Accordingly, it becomes possible to set, in advance, only the specific POIs that are to be landmarks in the traveling direction of the vehicle as search targets in a distant area in which a searching region is large and there is a smaller need for guiding information regarding points than in the vicinity of the vehicle position. Note that the aforementioned S3 and S8 correspond to processings of the point information obtaining unit.

Thereafter, in S9, the CPU 41 displays the searched POIs on the liquid crystal display 17 based on the search result of the aforementioned S3 and S8. Specifically, the CPU 41 displays the icon symbols (FIG. 3) corresponding to the types of the searched POIs on positions corresponding to the position coordinates of the POIs. Further, a size of the icon symbol to be displayed differs depending on the distance from the current position of the vehicle to the POI, and as the point is located farther from the current position of the vehicle, a size thereof becomes smaller.

Figure 7:
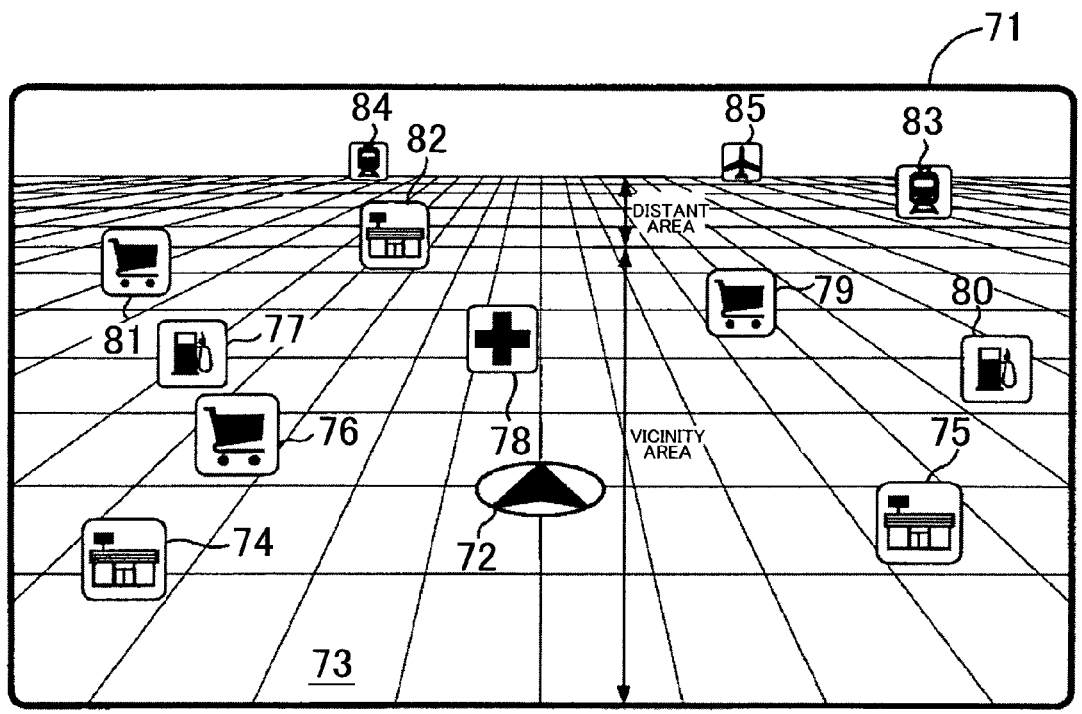
FIG. 7 is a view showing a travel guidance screen to be displayed on a liquid crystal display in the navigation apparatus according to the present embodiment.
Figure 7:
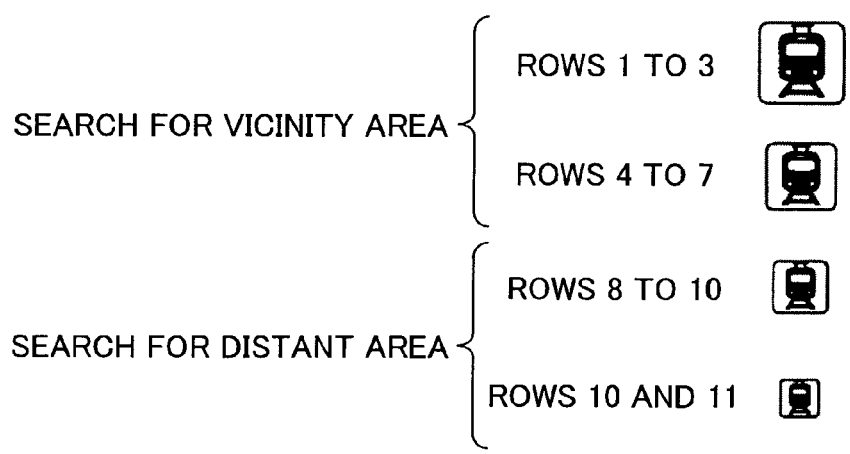
Figure 8:
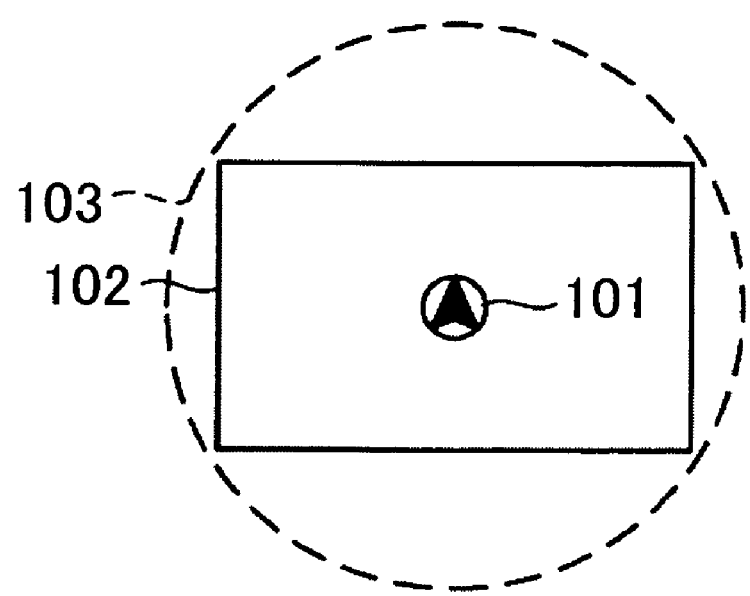
FIG. 8 is a view showing a display target area in a case where a map image is displayed in 2D.
Figure 9:
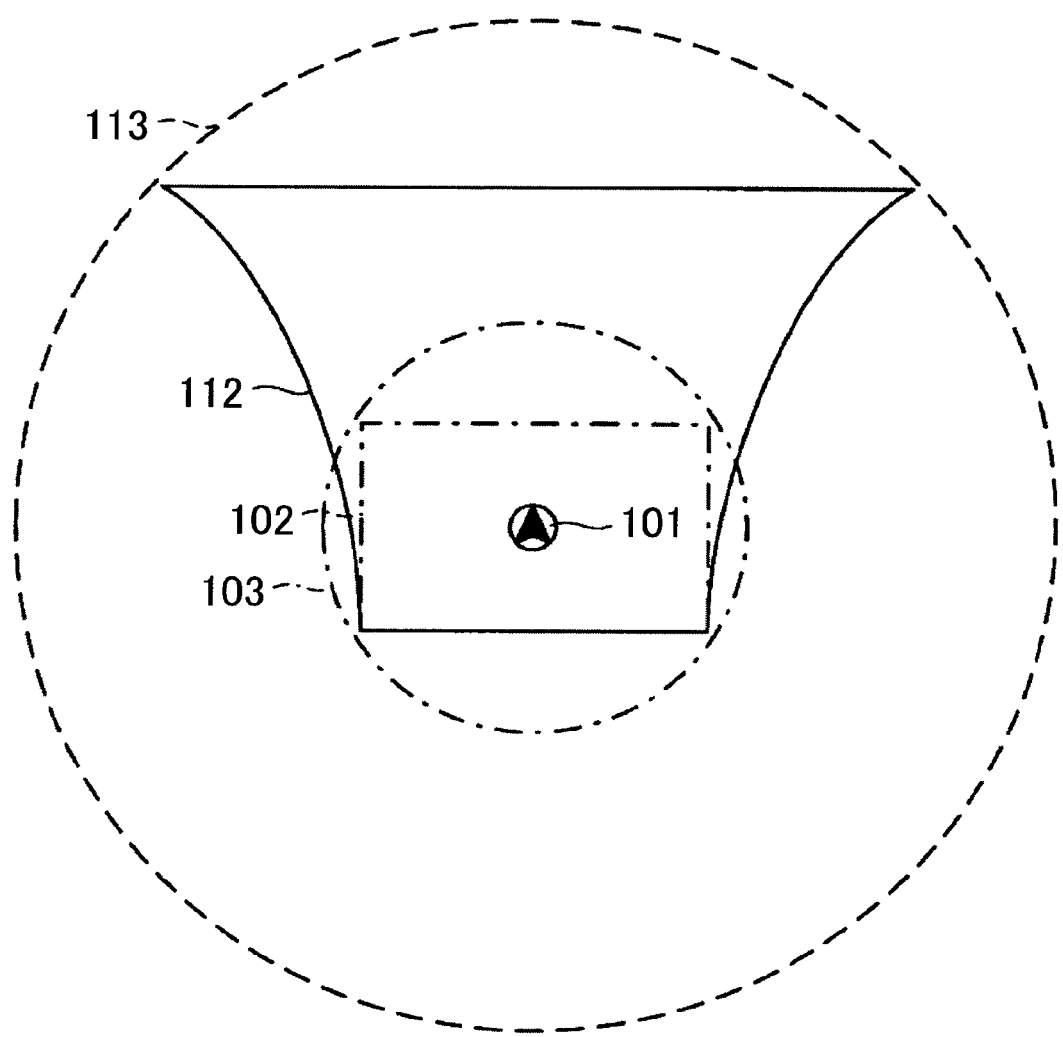
FIG. 9 is a view showing a display target area in a case where a map image is displayed in 3D.

Here, FIG. 7 is a view showing a travel guidance screen 71 to be displayed on the liquid crystal display 17 in the navigation apparatus 1 according to the present embodiment.

As shown in FIG. 7, the travel guidance screen 71 is formed of a vehicle position mark 72 indicating the current position of the vehicle, a map image 73 which is displayed in 3D and icon symbols 74 through 85 drawn on the map image 73.

Further, sizes of the icon symbols 74 through 85 changes depending on the rows (grids counted from below) in which the position coordinates of the POIs are included. Specifically, the icon symbols 74 through 76 of POIs located in the rows 1 to 3 are displayed in the largest size, the icon symbols 77 through 82 of POIs located in the rows 4 to 7 are displayed in the second largest size, the icon symbol 83 of POI located in the rows 8 to 10 is displayed in the third largest size, and the icon symbols 84 and 85 of features located in the rows 11 and 12 are displayed in the smallest size. Note that an area of the rows 1 to 7 shown in FIG. 7 corresponds to the area (area 54 shown in FIG. 5) in the vicinity of the vehicle position in which all the types of POIs are set as the targets, and an area of the rows 8 to 12 corresponds to the area (area 55 shown in FIG. 5) distant from the vehicle position in which only the specific types of POIs are set as the search targets.

Therefore, a user can recognize the types of POIs (convenience stores, gas stations and the like) located in the periphery of the vehicle and the positions thereof by referring to the travel guidance screen 71 displayed on the liquid crystal display 17. Further, based on the size of the icon symbol, the user can recognize an approximate distance to the POI corresponding to the icon symbol. In the area distant from the vehicle position, only the icon symbols of the specific POIs (airports and stations) are displayed, which reduces a possibility that the icon symbols are displayed while being overlapped with each other in the distant area. Further, a direction of the vehicle can be confirmed based on the displayed icon symbol of the specific POI. Note that the aforementioned S9 corresponds to a processing of the guidance unit.

Next, in S10, the CPU 41 determines whether or not there is the second searching region in which the POIs are not yet searched. As a result, if it is determined that there is the second searching region in which the POIs are not yet searched (S10: YES), the processing goes back to S8, in which the rest of the second searching regions are searched in accordance with the searching order and information regarding points is obtained from the map information DB 22. Subsequently, in the same manner, the searched POIs are displayed on the liquid crystal display 17.

Meanwhile, if it is determined that there is no second searching regions in which the POIs are not yet searched (S10: NO), the POI guidance processing program is terminated.

As has been described in detail, in the navigation apparatus 1, the point information guidance method conducted by the navigation apparatus 1, and the computer program executed in the navigation apparatus 1 according to the present embodiment, when the map image in the periphery of the vehicle position is displayed on the liquid crystal display 17 especially in 3D, the POIs located in the first searching region within the first searching distance from the current position of the vehicle are searched in the area in the vicinity of the vehicle position by setting all the types of POIs as the search targets (S1 through S3), the POIs located in the second searching region within the second searching distance from the second searching point are searched in the area distant from the vehicle position by setting only the specific types of points as the search targets (S4 through S8), and the icon symbols indicating the types and positions of the points are displayed on the map image while being overlapped therewith based on the searched POIs (S9). Accordingly, even when the POIs are searched from a large area or an area with a distorted shape, it is possible to minimize the searching region. Therefore, it becomes possible to reduce a processing load on a CPU and a required amount of memory at the time of searching the POIs.

Further, when the searching region is set to be a circular one, it is possible to search information regarding points by using a searching region with a new shape in which a plurality of circular searching regions formed by specifying a plurality of center points of the former searching region are combined together. Accordingly, even when the POIs are searched from an area with a distorted shape, the searching region can be minimized.

Further, since a circular searching region for searching an area distant from the current position of the vehicle is made to be smaller than a searching region for searching an area in the vicinity of the current position of the vehicle, the searching region can be minimized especially when searching an area of a substantially trapezoid shape that is to be a display target on a display at the time of performing the 3D display.

Further, since only information regarding the specific types of points is set as the search target when searching the area distant from the current position of the vehicle, it becomes possible to set, in advance, only the specific POIs that are to be landmarks in the traveling direction of the vehicle as search targets in the distant area in which a searching region is large and there is a smaller need for guiding information regarding points than in the vicinity of the vehicle position.

Based on a traveling direction of the vehicle to be predicted, it becomes possible to preferentially search information regarding points from an area which is highly required to be guided in the future and to provide guidance regarding the information to a user. Accordingly, even if it takes a long time for the CPU to perform a search processing, it is possible to provide appropriate guidance regarding the points.

Further, since the information regarding the points is provided by displaying the icon symbols on the map image, it becomes possible to make a user easily understand the information regarding the points at a glance.

Note that the present invention is not limited to the aforementioned embodiment, and it is needless to say that various improvements and modifications can be made without departing from the scope of the present invention.

For instance, in the present embodiment, the first searching distance and the second searching distance specifying the searching regions of the POIs are set based on the full length L of the display target area (refer to FIG. 5), but, they may have fixed values.

Further, in the present embodiment, the search is performed in the area (area 55 shown in FIG. 5) distant from the vehicle position by setting only the specific types of POIs (airports and stations) as targets. However, a user may select the types of the POIs that are to be the search targets. Further, the search may also be performed in the area (area 54 shown in FIG. 5) in the vicinity of the vehicle position by setting only the specific types of POIs as the targets.

What is claimed is:

1. A navigation apparatus, comprising:
a current position obtaining unit that obtains a current position of a vehicle;
a searching region setting unit that sets, based on the current position of the vehicle obtained by the current position obtaining unit, a plurality of searching regions to search for facilities in a display target area of a display
a facility information obtaining unit that obtains information regarding facilities located in the plurality of searching regions set by the searching region setting unit; and
a guidance unit that provides guidance regarding the information related to the facilities obtained by the facility information obtaining unit, wherein
the display target area includes a vicinity area in which the current position of the vehicle is located and a distant area that is distant from the current position of the vehicle compared to the vicinity area, and
the searching region setting unit sets a first searching region centered on the current position of the vehicle included in the vicinity area as a searching region to search for facilities located in the vicinity area, and sets a second searching region centered on a searching point specified in the distant area as a searching region to search for facilities located in the distant area.

2. The navigation apparatus according to claim 1, further comprising:
a traveling direction detecting unit that detects a current traveling direction of the vehicle, wherein
the searching region setting unit sets searching distances of the first searching region and the second searching region, respectively, based on a full length of the display target along the current traveling direction of the vehicle.

3. The navigation apparatus according to claim 1, wherein the vicinity area and the distant area are contiguous.

4. The navigation apparatus according to claim 1 wherein the searching region setting unit sets a plurality of second searching regions and sets a searching order for the plural second regions.

5. The navigation apparatus according to claim 1, wherein the facility information obtaining unit searches the first and second searching regions separately and in sequence, beginning with the first searching region.

6. The navigation apparatus according to claim 5, wherein the facility information obtaining unit searches for fewer types of facilities in the distant area than in the vicinity area.

7. The navigation apparatus according to claim 1, wherein the facility information obtaining unit searches for fewer types of facilities in the distant area than in the vicinity area.

8. A non-transitory computer-readable program installed in a computer, the computer program causing the computer to execute the functions of:
obtaining a current position of a vehicle;
setting a plurality of searching regions based on the obtained current position to search for facilities in a display target area of a display, wherein the display target area includes a vicinity area in which the obtained current position is located and a distant area that is distant from the current position of the vehicle compared to the vicinity area, and wherein the set searching regions include a first searching region centered on the current position of the vehicle included in the vicinity area as a searching region to search for facilities located in the vicinity area, and a second searching region centered on a searching point specified in the distant area as a searching region to search for facilities located in the distant area;
obtaining information regarding facilities located in the plurality of set searching regions; and
providing, as guidance, the obtained information related to the facilities.

* * * * *